(12) United States Patent
Sawant et al.

(10) Patent No.: US 7,858,704 B2
(45) Date of Patent: Dec. 28, 2010

(54) DIMERCAPTAN TERMINATED POLYTHIOETHER POLYMERS AND METHODS FOR MAKING AND USING THE SAME

(75) Inventors: Suresh G. Sawant, Stevenson Ranch, CA (US); Chandra B. Rao, Valencia, CA (US); Michael A. Cosman, Valencia, CA (US)

(73) Assignee: PRC DeSoto International, Inc., Glendale, CA (US)

( * ) Notice: Subject to any disclaimer, the term of this patent is extended or adjusted under 35 U.S.C. 154(b) by 0 days.

(21) Appl. No.: 12/581,232

(22) Filed: Oct. 19, 2009

(65) Prior Publication Data

US 2010/0036063 A1     Feb. 11, 2010

Related U.S. Application Data

(62) Division of application No. 11/260,553, filed on Oct. 27, 2005, now abandoned.

(51) Int. Cl.
*C08L 33/14* (2006.01)
*C08L 41/00* (2006.01)
*C08G 75/00* (2006.01)

(52) U.S. Cl. ............... 525/212; 525/191; 525/328.5; 525/535; 528/373; 528/374; 528/375; 528/376; 427/372.2

(58) Field of Classification Search ............... 525/212, 525/191, 328.5, 535; 528/373, 374, 375, 528/376; 427/372.2
See application file for complete search history.

(56) References Cited

U.S. PATENT DOCUMENTS

| 5,741,884 A | 4/1998 | Cai et al. |
| 2004/0039121 A1 | 2/2004 | Zook et al. |

FOREIGN PATENT DOCUMENTS

| JP | 02-032157 | 2/1990 |
| WO | 98/39365 | 9/1998 |
| WO | 01/66621 | 9/2001 |
| WO | 01/66623 | 9/2001 |

*Primary Examiner*—Duc Truong
(74) *Attorney, Agent, or Firm*—Diane R. Meyers

(57) ABSTRACT

Dimercaptan terminated polythioether polymers are disclosed, as are methods for making and using the same.

2 Claims, No Drawings

DIMERCAPTAN TERMINATED POLYTHIOETHER POLYMERS AND METHODS FOR MAKING AND USING THE SAME

CROSS-REFERENCE TO RELATED APPLICATION

This patent application is a divisional of U.S. patent application Ser. No. 11/260,553 filed Oct. 27, 2005, entitled: "DIMERCAPTAN TERMINATED POLYTHIOETHER POLYMERS AND METHODS FOR MAKING AND USING THE SAME" now abandoned.

FIELD OF THE INVENTION

The present invention relates to dimercaptan terminated polythioether polymers. The invention is also directed to methods for making and using these polymers.

BACKGROUND OF THE INVENTION

Thiol-terminated sulfur-containing polymers are known to be well-suited for use in aerospace sealants due to their fuel resistant nature upon crosslinking. Among the commercially available polymeric materials that have sufficient sulfur content to exhibit this desirable property are the polysulfide polymers described, for example, in U.S. Pat. No. 2,466,963, and the alkyl side chain-containing polythioether polymers described, for example, in U.S. Pat. No. 4,366,307. Materials useful in this context also have the desirable property of liquidity at room temperature.

Another desirable combination of properties for aerospace sealants that is much more difficult to obtain is the combination of long application time or "pot life" (the time during which the sealant remains usable) and short curing time (the time required to reach a predetermined strength). High temperature resistance may also be desired for aerospace sealants. Compositions that have low Tg, are liquid at room temperature, have good pot life and/or good performance characteristics are desired for aerospace applications.

SUMMARY OF THE INVENTION

The present invention is directed to a dimercaptan terminated polythioether polymer having the formula (I):

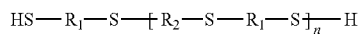
(I)

wherein each $R_1$ is the same and is represented by the formula (I):

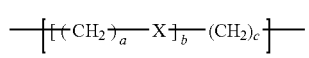
(II)

X is O or S; a is 2 to 6; b is 1 to 5; c is 2 to 10; n is 1 or greater; and $R_2$ is a diene residue other than a divinyl ether residue, a triene residue or a residue from an organic compound having a terminal leaving group.

Methods for making and using the polymer of formula (I) are also within the scope of the present invention.

DETAILED DESCRIPTION OF THE INVENTION

The present invention is directed to a dimercaptan terminated polythioether polymer having the formula (I):

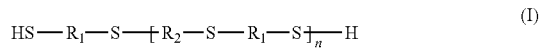
(I)

wherein each $R_1$ is the same and is represented by the formula (II):

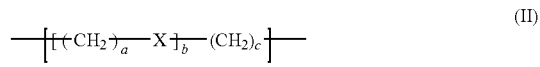
(II)

X is O or S; a is 2 to 6; b is 1 to 5; c is 2 to 10; n is 1 or greater; and $R_2$ is a diene residue other than a divinyl ether residue; a triene residue, or a residue from an organic compound having a terminal leaving group. A "diene residue", "triene residue" and a "residue from an organic compound having a terminal leaving group" will be understood as referring to the moiety that remains upon reaction of the diene, triene or compound with a leaving group, respectively. In certain embodiments, X is O and a, b, and c are all 2, n is 1, and $R_2$ is the residue of vinylcyclohexene.

The polythioether polymers of the present invention are liquid at room temperature and pressure, have low Tg and have good fuel resistance. As used herein, the term "room temperature and pressure" means approximately 77° F. (25° C.) and one atmosphere. "Low Tg" refers to a glass transition temperature of −50° C. or lower. In certain embodiments of the present invention, the Tg is −55° C. or lower, such as −60° C. or lower or even −70° C. or lower. Low Tg is indicative of good low temperature flexibility in a cured formulation, which can be determined by known methods, such as those described in Aerospace Material Specification (AMS) 3267 §4.5.4.7, Aerospace Material Specification (AMS) 8802B §(AS 5127/17.6) and Military Specification (MIL-S) MIL-S-29574, and by methods similar to those described in ASTM D 522-88. Typically, good low temperature flexibility means no loss of adhesion to substrate, no cracking, no checking, etc. The polythioether polymers of the present invention may also exhibit very desirable fuel resistance characteristics when cured. One measure of the fuel resistance of a polymer is their percent volume swell after prolonged exposure to a hydrocarbon fuel, which can be quantitatively determined using methods the same as or similar to those described in ASTM D 792 or AMS 3269. In certain embodiments, the present polythioether polymers, when cured, have a percent volume swell of 25 percent or less after immersion for one week at 140° F. (60° C.) and ambient pressure in jet reference fluid (JRF) type 1. In certain embodiments, the percent volume swell is 20 percent or less.

The present polythioether polymers can have a number average molecular weight ranging from 200 to 8000, such as 200 to 4000, or 200 to 520.

It will be appreciated that the polythioether polymers of the present invention are polyfunctional; that is, they have two or more functional groups. At least two functional groups will be terminal mercaptan groups. Functionality can also be introduced via the $R_1$ and/or $R_2$ moieties. For example, if $R_2$ is a triene residue, the functionality of the polythioether may be more than two. These polymers can be prepared by reacting two moles of the compound of formula (III):

where $R_1$ is as described above, with one mole of a diene, triene or other organic compound having a terminal leaving group. Any suitable diene, triene or other organic compound can be used including cycloaliphatic, aliphatic and aromatic dienes and trienes. The diene is not a divinylether. A particularly suitable diene is vinyl cyclohexene, such as 4-vinyl-1-cyclohexene, which will be understood as having the formula (IV):

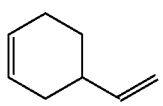

It will be understood that when the diene is 4-vinyl-1-cyclohexene, the present polymer will have the structure (V):

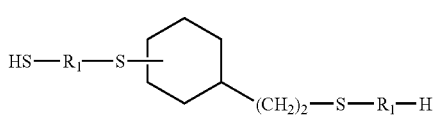

Other suitable compounds include triallylcyanurate and di or tri halides such as dichloroalkane and trichloroalkene.

In certain embodiments, formula (III) is dimercaptodioxaoctane ("DMDO").

Certain embodiments of the present invention, such as when formula (III) is DMDO and the diene is vinyl cyclohexene, result in a polythioether polymer that can be used to lower the viscosity of a composition; in this manner, the compounds of the present invention can function as reactive diluents. This provides a significant advantage over the art; compositions utilizing the polymer of the present invention have a lower viscosity without the use of solvent. Thus, solvent use can be minimized if not eliminated according to the present invention. Elimination and/or minimization of solvent has obvious positive environmental implications; because there is little or no "flash off" of the solvent as it evaporates, handling of the present compositions is improved as compared to other compositions having higher solvent content. In addition, the use of the polymer of the present invention in a composition serves to slow down the cure of the composition, thus providing a longer "pot life" and/or time to apply the composition to a substrate. Accordingly, the present invention is further directed to a composition comprising a polythioether polymer as described above.

In addition to the polythioether polymer described above, the compositions of the present invention can further comprise one or more additional sulfur-containing compounds, a curing agent and one or more additional additives. "Sulfur-containing compounds" and like terms refer to any compound or blend of compounds wherein at least one component comprises a sulfur molecule. Examples can include those known in the art, such as polysulfides, and/or polythioethers, such as those polysulfides commercially available from Akzo Nobel under the name THIOPLAST and from Toray under the name THIOKOL LP, and such as those polythioethers described in U.S. Pat. Nos. 6,172,179; 5,912,319; and 4,609,762. In certain embodiments, the sulfur-containing compounds comprise a polymer blend comprising a polysulfide component and a polythioether component, such as that described in U.S. application Ser. No. 10/935,857, hereby incorporated by reference. It will be appreciated that the present polymers are themselves sulfur-containing compounds and can be used in the present compositions without any other sulfur-containing compounds. The term "curing agent" refers to a material that can be added to the present composition to accelerate the curing or gelling of the sulfur-containing compound(s). "Curing", "cure" and like terms refer to the point at which the composition achieves a cure hardness of 30 Durometer "A" as measured according to ASTM D2240. Any suitable curing agent can be used. In certain embodiments, the curing agent contains oxidizing agents that oxidize terminal mercaptan groups to form disulfide bonds. Suitable curing agents include, for example, lead dioxide, manganese dioxide, calcium dioxide, sodium perborate monohydrate, calcium peroxide, zinc peroxide, dichromate and epoxy.

Various additives such as fillers, adhesion promoters and plasticizers can also be used in the present compositions. Fillers useful in the present compositions, especially for aerospace applications, include those commonly used in the art, such as carbon black, calcium carbonate ($CaCO_3$), silica, nylon, microspheres and the like. In one embodiment, the compositions include 10 to 70 weight percent of the selected filler or combination of fillers, such as 10 to 50 weight percent based upon the total weight of the composition.

One or more adhesion promoters can also be used. Suitable adhesion promoters include phenolics such as METHYLON phenolic resin available from Occidental Chemicals, and/or organosilanes such as epoxy, mercapto or amino functional silanes such as A-187 and A-1100 available from OSi Specialties. In one embodiment, an adhesion promoter is used in an amount from 0.1 to 15 weight percent based upon total weight of the formulation.

A plasticizer can be used in the compositions, often in an amount ranging from 1 to 8 weight percent based upon total weight of the formulation. Useful plasticizers include phthalate esters, chlorinated paraffins, and hydrogenated terphenyls.

The compositions can further comprise one or more organic solvents, such as ethyl acetate, often in an amount ranging from 0 to 15 percent by weight on a basis of total weight of the formulation, such as less than 15 weight percent or less than 10 weight percent.

Compositions of the present invention can also optionally include other standard additives, such as pigments; thixotropes; retardants; catalysts; and masking agents.

Useful pigments include those conventional in the art, such as carbon black and metal oxides. Pigments can be present in an amount from 0.1 to 10 weight percent based upon total weight of the composition.

Thixotropes, for example fumed silica or carbon black, can be used in an amount from 0.1 to 5 weight percent based upon total weight of the composition.

Certain compositions of the present invention comprise 1 to 30 weight percent, such as 5 to 20 weight percent of the mercaptan terminated polythioether polymers of the present invention; 20 to 70 weight percent, such as 35 to 50 weight percent, of a sulfur-containing compound other than the present polymer; from 1 to 50 weight percent, such as 5 to 25 weight percent or 10 weight percent of a curing agent; and 10 to 50 weight percent, such as 5 to 30 weight percent or 25 weight percent of other additives, with weight percent being based on the total weight of the composition. For compositions in which the present polymer is the only sulfur-containing compound, these weight percentages are adjusted accordingly.

The present compositions are typically packaged as a two-component or "2K" system. One component comprises the polythioether polymer of the present invention, and optionally other sulfur-containing compound(s) and may also contain one or more of various additives, such as filler(s), extender(s), adhesion promoter(s), accelerator(s), and/or retardant(s); the second component generally comprises the curing agent and may also contain one or more of various additives, such as plasticizer(s), filler(s), accelerator(s), and/or retardant(s). The two components are mixed immediately prior to use. For example, the two components can be mixed using a specially adapted cartridge/rod system such as that commercially available from PRC-DeSoto International, Inc. as SEMKIT. Alternatively, the components can be mixed together and the mixture maintained at a temperature below that at which the curing agent is reactive. The term "reactive" means capable of chemical reaction and includes any level of reaction from partial to complete reaction of a reactant. A storage temperature of below −40° C. is typically suitable to retard or prevent the reaction between the curing agent and the polythioether polymer component.

A particularly suitable use for the compositions of the present invention is in all classes of sealants. A sealant according to the present invention is one that comprises any of the mercaptan terminated polythioether polymers described herein. "Sealant" and like terms refer to compositions that have the ability to resist atmospheric conditions such as moisture and/or temperature and/or at least partially block transmission of materials such as water, fuel, and/or other liquids and gases. Sealants often have adhesive properties, as well. Sealants are generally identified by "Class", based on their viscosity. Class A sealants generally have a viscosity of 100 to 400 poise. Because these sealants are typically brush-applied, they are often referred to as a "brush coat". Class B sealants typically have a viscosity of 6000 to 18000 poise, and are typically applied through use of an extrusion gun or a spatula. These sealants may be used on a fillet seal, and are commonly used as fuel tank sealants. Class C sealants generally have a viscosity between that of Class A and Class B sealants, such as from 1000 to 4000 poise. Class C sealants can be applied in various manners, such as with a brush, roller or extrusion gun, and may be used for a "fay seal". Accordingly, the present invention is further directed to a sealant comprising any of the compositions comprised above.

The compositions of the present invention can be applied to any number of substrates including, for example, titanium, stainless steel, aluminum, and the primed, organic coated and chromate forms thereof, epoxy, urethane, graphite, fiber glass composite, KEVLAR, acrylics and polycarbonates. As noted above, the present compositions are particularly useful in aerospace applications, such as aerospace sealants and the linings for fuel tanks, fuselages, and the like. An aerospace sealant material according to the present invention can exhibit properties including high temperature resistance, fuel resistance and/or flexural strength. The formulations described herein may also be well suited for uses in which temperature extremes, chemically harsh environments and/or mechanical vibrations are experienced. The present formulations may be used outside of aerospace applications as well.

The polymer of the present invention is generally ungelled, which means that the polymer blend has an intrinsic viscosity that can be measured. The cured formulations of the present invention generally have good low temperature flexibility, which is desired in aerospace applications since the formulations are subjected to wide variations in environmental conditions, such as temperature and pressure, and physical conditions such as joint contraction and expansion and/or vibration.

Viscosities as reported herein are measured at a temperature of about 25° C. and a pressure of about 760 mm Hg determined according to ASTM D-2849, paragraphs 79 to 90 using a Brookfield Viscometer.

The present invention is further directed to methods for sealing an aperture comprising applying to a surface associated with the aperture any of the sealants described herein. An adhesion promoter can be applied to the surface prior to the sealant if desired. "Aperture" refers to a hole, gap, slit or other opening. In certain embodiments, the aperture is on an aviation or aerospace vehicle.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while reference is made herein to "a" polythioether polymer, one or more polythioether polymers, at least one of which is within the present invention, can be used. Similarly, one or more sulfur-containing compounds, one or more curing agents and/or one or more of any of various additives can be used in the present compositions. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Example 1

1,8-Dimercapto-3,6-dioxaoctane (616.95 g, 3.38 moles CAS #14970-87-7) was charged into a 1 liter four-necked round bottom flask equipped with a mechanical stirrer, thermometer, and two gas passing adapters (one for inlet of nitrogen and the other for outlet). The flask was flushed with dry nitrogen and the contents were heated to 32° C.

4-Vinylcyclohexene (183.05 g, 1.69 moles, CAS #100-40-3) was added into stirring dithiol over 3 hours, 15 minutes. Mild exotherm developed during the addition but the temperature was maintained at 42° C. to 45° C. The reaction mixture was heated for 3 hours at 55° C. Five portions (140 g each) of free radical initiator (VAZO-52 (2,2'azobis) 2,4-dimethylpentanenitrile, CAS #4419-11-8, commercially available from DuPont) were added over an interval of 2 hours at 55 to 60° C. The reaction mixture was evacuated at 70 to 75° C./7 to 8 mmHg for 2 hours to give a clear, colorless product. Yield: 800 grams (100%); mercaptan equivalent: 238 (theoretical: 236); viscosity: 1.331 poise.

Example 2

A Class B sealant was prepared by mixing the components listed in Table 1 in a double shaft cowles type batch mixer until homogeneous under a vacuum of 27 inches of mercury or greater. Components A and B were mixed in a weight ratio of 100:12 to prepare the final sealant.

TABLE 1

Component A

| Ingredient | Weight Percent | | | |
|---|---|---|---|---|
| | Sample 1 | Sample 2 | Sample 3 | Sample 4 |
| Ethyl Acetate | 1 | 1 | 1 | 1 |
| VCH extended DMDO prepared according to Example 1 | 7 | 6 | 7 | 7 |
| Modified polysulfide[1] | 6.5 | — | 6.5 | — |
| Modified polysulfide[2] | — | 6.5 | — | 6.5 |
| LP-55[3] | 46 | 46 | 45 | 45 |
| Polythioether[4] | 12.5 | 12 | 12.5 | 12.5 |
| Sulfur-containing phenolic | 2.5 | 2.5 | 2.5 | 2.5 |
| Sulfur-containing phenolic | 1.75 | 1.75 | 1.7 | 1.7 |
| Polysulfide latex | 1 | 1.3 | 1.4 | 1.4 |
| Sulfur | 0.1 | 0.2 | 0.17 | 0.17 |
| Silica | 6.5 | 5.5 | 5.5 | 5.5 |
| Precipitated CaCO$_3$ | 10 | 10 | 10 | 10 |
| Nylon[5] | 5.5 | 6 | 5.5 | 5.5 |
| Polymeric microsphere[6] | 1.06 | 0.95 | 0.93 | 0.93 |
| Mercapto silane[7] | 0.2 | 0.2 | 0.2 | 0.2 |
| Amino silane[8] | 0.12 | 0.1 | 0.1 | 0.1 |
| Viscosity (poise) | 9600 | 8400 | 6600 | 6800 |

Component B

| Ingredient | Weight Percent |
|---|---|
| MnO$_2$ | 55 |
| Plasticizer[9] | 38 |
| Stearic acid | 0.6 |
| Sodium stearate | 0.7 |
| Molecular sieve powder[10] | 0.7 |
| Dipentamethylene/thiuram/polysulfide mixture[11] | 5.0 |

[1]Prepared according to U.S. Pat. No. 4,623,711 (molecular weight approximately 2200).
[2]Prepared according to U.S. Pat. No. 4,623,711 (molecular weight approximately 2500).
[3]THIOKOL LP-55 polysulfide polymer, commercially available from Toray Fine Chemicals.
[4]Prepared according to U.S. Pat. No. 6,172,179 (molecular weight approximately 3000).
[5]ORGASOL, commercially available from Atofina.
[6]EXPANCEL, commercially available from Akzo.
[7]Commercially available from OSi.
[8]Commercially available from OSi.
[9]Partially hydrogenated terphenyl (HB-40), commercially available from Solutia.
[10]Alkali metal alumino-silicate 3-angstrom powder, commercially available from UOP.
[11]Akrochem Accelerator DPTT Powder, commercially available from Akrochem Corp.

The sealant of Sample 2 was tested to the requirements of proposed specification BMS 5-142 with excellent results, as illustrated in Table 2 below.

TABLE 2

| Test Property | Requirement | Sample 2 |
|---|---|---|
| Viscosity (poise) | 6,000 to 13,000 | 8,400 |
| Specific gravity (max) | 1 to 10 | 1.04 |
| Nonvolatile content, % min | 90 to 0 | 96 |
| Flow (inch) | 0.10 to 0.50 | 0 to 10 |
| Application time after 1 hour, g/min (min) | 15 | 48 |
| Tack-free time, hours (max) | 12 | <2 |
| Cure rate after 24 hours (min) | 30 | 34 @ 6 hours |
| Weight loss % (max) | 16.0 | 7.26 |
| Flexibility | No cracking, checking or delamination | Passed |
| Dry tensile strength psi (min) | 150 | 210 |
| Type III* Immersion tensile strength psi (min) | 150 | 225 |
| Dry elongation % (min) | 150 | 220 |
| Type III Immersion elongation % (max) | 150 | 220 |
| Moisture and fuel stability % (max) | | |
| distilled water, 5 days @ 120° F. | 20.0 | 19.3 |
| Type III*, 5 days @ 120° F. | 5.0 | 2.34 |

*Jet reference fluid TT-S-735A Type III

Sample 2 also had good peel strength and showed resistance to hydrocarbon fluid when tested according to the same specification.

Whereas particular embodiments of this invention have been described above for purposes of illustration, it will be evident to those skilled in the art that numerous variations of the details of the present invention may be made without departing from the invention as defined in the appended claims.

What is claimed is:

1. A composition comprising:
   a) dimercaptan terminated polythioether polymer having the formula (I):

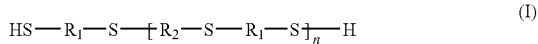

(I)

wherein each R$_1$ is the same and is represented by the formula (II):

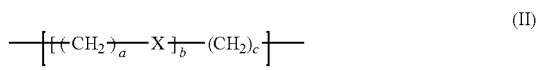

(II)

X is O or S; a is 2 to 6; b is 1 to 5; c is 2 to 10; n is 1 or greater, and R$_2$ is a diene residue other than a divinylether residue, a triene residue, or a residue from an organic compound having a terminal leaving group; and
   b) a polymer blend comprising a polysulfide and a polythioether.

2. The composition of claim 1, wherein X is O; a is 2; b is 2; c is 2; n is 1, and R$_2$ is the residue of vinyl cyclohexene.

* * * * *